(12) United States Patent
Maliszewski et al.

(10) Patent No.: US 6,227,448 B1
(45) Date of Patent: May 8, 2001

(54) IMAGE VIEWING APPARATUS

(75) Inventors: Julian Robert Maliszewski; Martin Philip Gouch, both of Herts (GB)

(73) Assignee: Fujifilm Electronic Imaging Ltd., London (GB)

( * ) Notice: Subject to any disclaimer, the term of this patent is extended or adjusted under 35 U.S.C. 154(b) by 0 days.

(21) Appl. No.: 09/059,336

(22) Filed: Apr. 14, 1998

(30) Foreign Application Priority Data

Apr. 15, 1997 (GB) .................................................. 9707552

(51) Int. Cl.$^7$ ....................................................... G06K 7/10
(52) U.S. Cl. ............................................. 235/454; 235/455
(58) Field of Search ................................. 355/70, 71, 75, 355/67–69, 77, 47, 74; 358/474–498; 235/462.32, 454, 158, 456, 455; 902/41; 250/234

(56) References Cited

U.S. PATENT DOCUMENTS 4,702,593  10/1987  Detsch .
5,850,281  * 12/1998  Benker .

FOREIGN PATENT DOCUMENTS 2 041 553   1/1983  (GB) .
WO 95/02937 1/1995  (WO) .
WO 95/16934 6/1995  (WO) .

OTHER PUBLICATIONS

Webster's II New Riverside University Dictionary 1988.*
Patent Abstracts of Japan, vol. 95, No. 003, Apr. 28, 1995 (JP 06 350810 A).
Patent Abstracts of Japan, 61–290859 (A); Dec. 20, 1986, Original Still Type Reader.
Patent Abstracts of Japan, 5–300317 (A); Nov. 12, 1993, Transmission Original Reader.
Patent Abstracts of Japan, 06350810 A;Dec. 22, 1994; Transmissive Original Scanning Device.

* cited by examiner

Primary Examiner—Karl D. Frech
Assistant Examiner—Jamara A Franklin
(74) Attorney, Agent, or Firm—Sughrue, Mion, Zinn, Macpeak & Seas, PLLC

(57) ABSTRACT

Image viewing apparatus comprises a transparent platen on which an image to be scanned can be positioned. A scanning system support is movable alongside the platen. A light source illuminates the platen from the same side as the scanning system support. A light diffuser can be moved between a first position in which it is located between the light source and the platen whereby light from the light source is diffused across the platen, and a second position in which the light diffuser is positioned so as not to impede a scanning system on the support from viewing an image on the platen.

16 Claims, 2 Drawing Sheets

IMAGE VIEWING APPARATUS

FIELD OF THE INVENTION

The invention relates to image viewing apparatus.

DESCRIPTION OF THE PRIOR ART

Image viewing apparatus is used in applications such as flat bed scanning in which an image such as a transparency to be digitised is laid on a platen and then individual pixels of the image are exposed to scanning radiation such as a laser beam and the reflected or transmitted light is detected and digitised. It is often required that the transparency should be viewable by the operator prior to scanning, for example to check for faults in the transparency.

In the past, the image has had to be mounted on a separate light table and, after viewing, then transferred to the scanner. In JP-A-06350810, a scanning device is described in which the image is mounted on a movable table which can be moved between an extended position in which it overlies a set of fluorescent tubes enabling the image to be viewed, and a retracted position to which it can be moved by operating a lead screw underneath a scanning system which enables the image to be scanned. A light diffuser is incorporated underneath the image so as to diffuse light from the fluorescent tubes to enable the image to be evenly lit for viewing.

The draw back of this known arrangement is the volume of space required since the image support or platen must be moved away from the scanning system over the fluorescent tubes.

SUMMARY OF THE INVENTION

In accordance with the present invention, image viewing apparatus comprises a transparent platen on which an image to be scanned can be positioned; a scanning system support movable alongside the platen; a light source for illuminating the platen from the same side as the scanning system support; and a light diffuser which can be moved between a first position in which it is located between the light source and the platen whereby light from the light source is diffused across the platen, and a second position in which the light diffuser is positioned so as not to impede a scanning system on the support from viewing an image on the platen.

This invention results in a much more compact arrangement. For example, the scanning system support is positioned on the same side of the platen as the light source in contrast to the prior art described above. The light diffuser is then moved between the first and second positions depending upon whether or not the apparatus is to be used as a light table.

Although in some cases the light diffuser could comprise a solid plate, preferably the light diffuser is flexible. This allows the light diffuser to be conveniently stored in a relatively small volume when in its second position and thus reducing still further the overall size of the apparatus. In the preferred example, the apparatus further comprises a roller about which the light diffuser is wound in the second position.

Typically, the light diffuser will be in the form of a flexible sheet made of a suitable material such as polyester.

In one arrangement, the apparatus further comprises an actuating means for moving the light diffuser between the first and second positions. For example, a user controlled motor could be coupled to the light diffuser. In other examples, however, the light diffuser is coupled to the scanning system support. In this way, the light diffuser can be automatically drawn under the platen during movement of the scanning system support and can then be moved to its second position during reverse movement of the scanning system support. Not only does this have the advantage that the light diffuser is automatically moved between its two positions without the need for auxiliary motors and the like but also the light diffuser will never obscure a scanning system mounted on the support.

Conveniently, the light diffuser is biased to its second position. This simplifies movement of the light diffuser to the second position, particularly when a flexible light diffuser is used. For example, the roller could be provided with a torsion spring mechanism or the like.

The other elements of the apparatus can be of a generally conventional form.

Typically there will be more than one light source and the or each light source conveniently comprises a fluorescent tube.

The platen will be made of a suitable, rigid transparent material such as glass or plastics.

The apparatus is particularly suitable for use in a flat bed scanner. In this case, a scanning system mounted on the support would comprise a radiation source such as a laser which generates a radiation beam which impinges on scanning optics such as a rotating polygonal mirror together with a detector for detecting light reflected from the image.

BRIEF DESCRIPTION OF THE DRAWINGS

Some examples of image viewing apparatus according to the present invention will now be described with reference to the accompanying drawings in which.

DETAILED DESCRIPTION OF THE EMBODIMENTS

Figure 1:
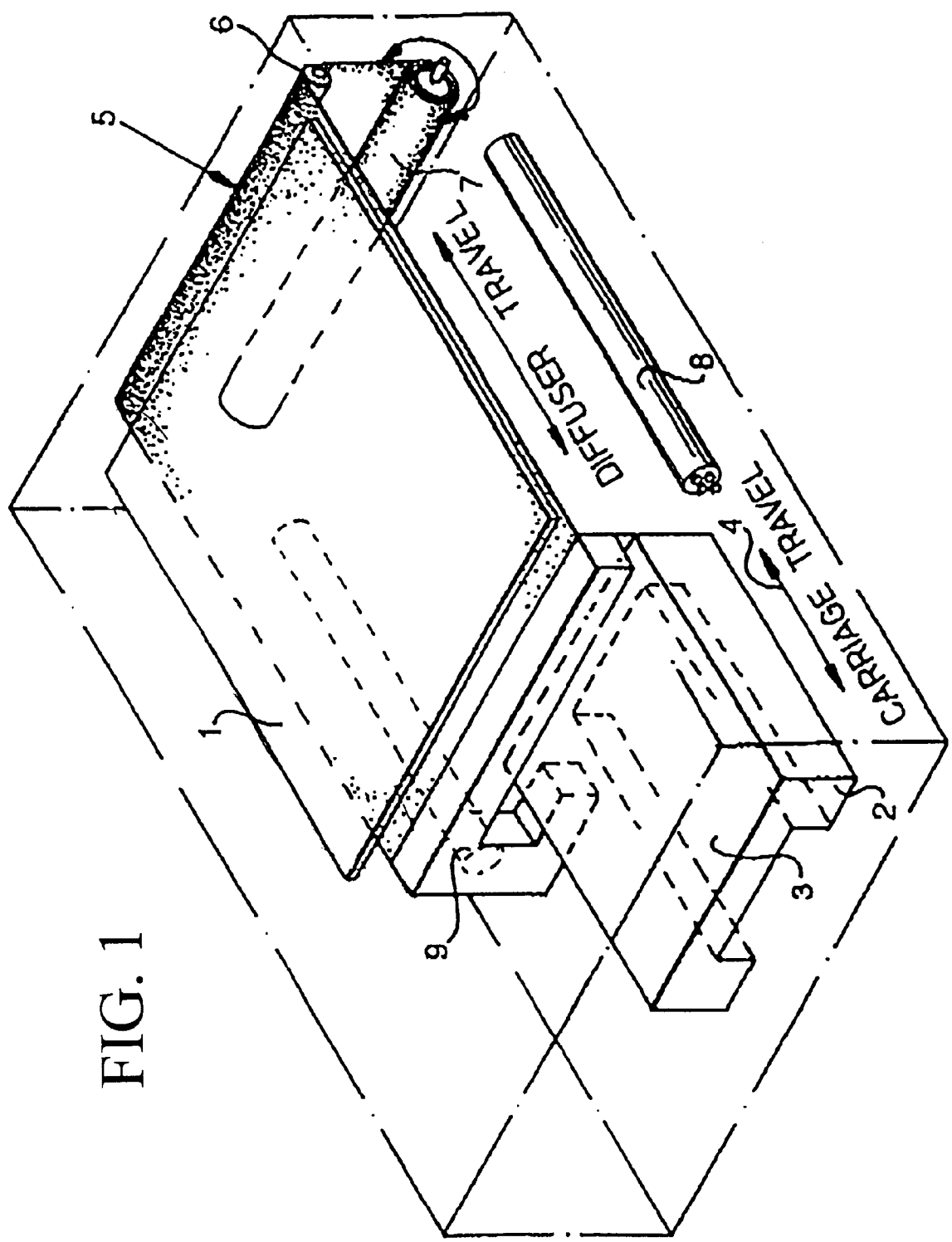
FIG. 1 is a schematic, perspective view of the apparatus according to a first example of the present invention; and, FIG. 2 is a schematic, perspective view of the apparatus according to a second example of the present invention.

The apparatus shown in FIG. 1 comprises a fixed, transparent platen of glass or plastics 1 on which a transparency or other photographic original can be placed for scanning. A carriage 2 having a support surface 3 is mounted on a track (not shown) for movement in directions 4 beneath the platen 1.

In use, the carriage 2 will carry on its surface 3 a scanning system such as a flat bed scanning system comprising a laser, scanning element such as a polygonal mirror, and a detector. Furthermore, a lid will usually be positioned over the platen to prevent ambient light being incident on the transparency during the scanning procedure. These features are not shown in the drawing for clarity.

As can be seen in the drawing, the carriage 2 can move beneath the platen 1 between a retracted position shown in the drawing in which the scanning system cannot scan an original on the platen and an extended position in which the carriage is positioned fully to the right.

Part of the carriage 2 is attached to a leading end of a flexible diffuser such as a polyester sheet 5. As shown in the drawing, this extends beneath the platen 1 from the carriage 2 and is guided around an idler roller 6 to a take-up roller 7. The roller 7 is connected to a torsion spring mechanism (not shown) which biasses the roller to take-up the diffuser 5 in a similar way to a roller blind or the like.

Positioned beneath the platen 1 and alongside the path of the carriage 2 are a pair of fluorescent tubes 8,9 which are operated when the apparatus is to be used as a light table.

In use, the operator places an original image or transparency on the upper surface of the platen 1 with the carriage 2 in its retracted position. The fluorescent tubes 8,9 are activated and light from the tubes will be diffused from the light diffuser 5 to provide uniform, illuminating background radiation to enable the image to be viewed from above the platen. Once the operator is satisfied, he will turn off the illumination and activate the scanning system and carriage 2. The carriage 2 will slowly traverse away from its retracted position while the scanning optics will traverse in a direction orthogonal to the direction of carriage movement so as to scan successive lines of the image. During movement of the carriage 2, the light diffuser 5 will be drawn around the roller 7 due to the action of the torsion spring and the light diffuser 5 will thus be slowly withdrawn from under the platen 1 and thus not obscure the scanning system.

Figure 2:
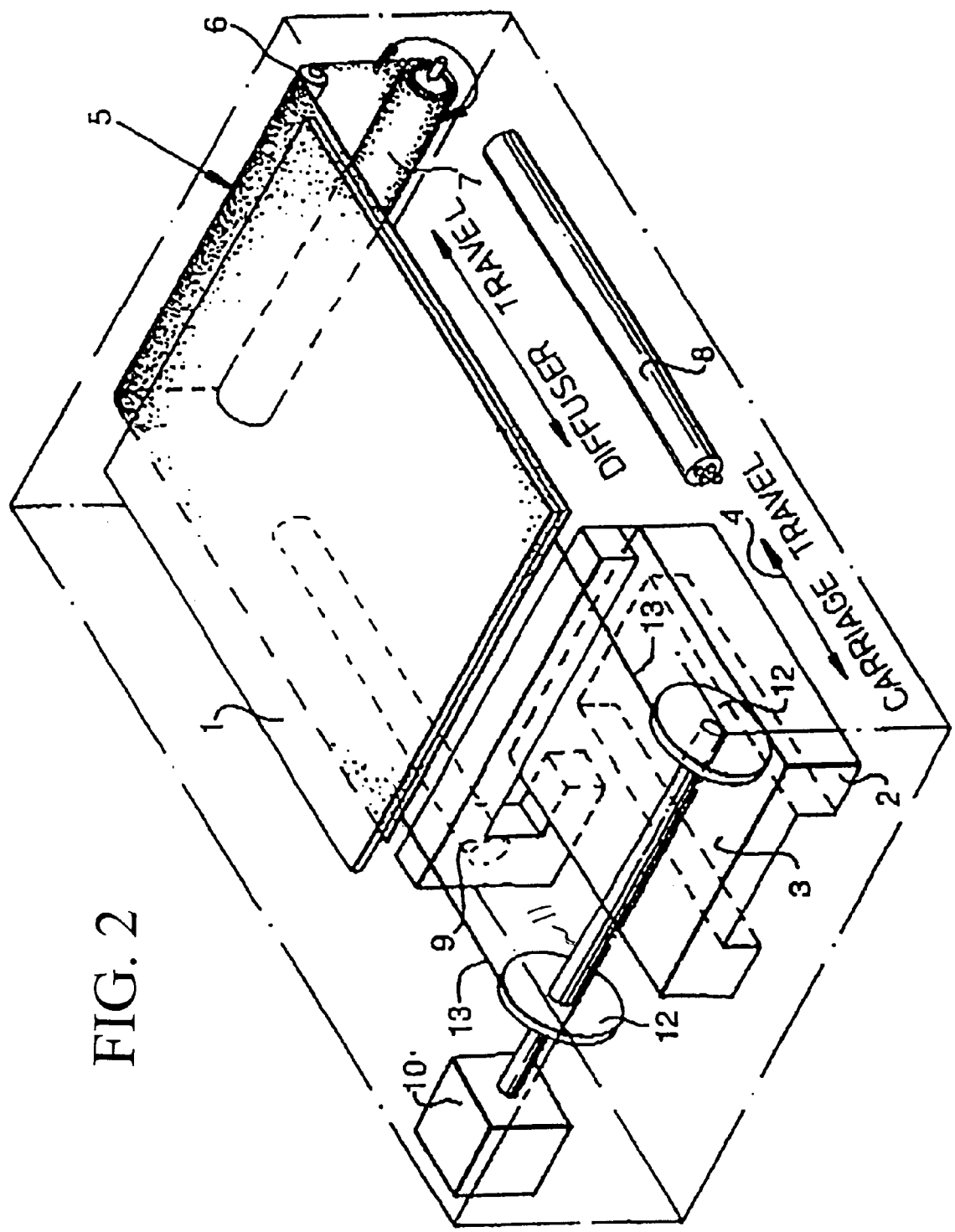

FIG. 2 shows apparatus according to a second example of the present invention. Reference numerals identical to those used in FIG. 1 have been used to denote components that are the same as those shown in FIG. 1. In this apparatus, the leading end of the flexible diffuser 5 is no longer attached to the carriage 2. Movement of the flexible diffuser is now achieved by the use of a motor 10 which is capable of operation independently of the carriage 2. The motor 10 is coupled to a shaft 11 upon which are fixably mounted two pulleys 12. Lengths of cable 13 are then attached from the pulleys 12 to the leading edge of the light diffuser 5 such that rotation of the motor 10 will cause linear motion of the leading edge of the light diffuser 5. In a similar manner to the previous example of the present invention, the operator places an original image transparency on the upper surface of the plane 1. With the carriage 2 in its retracted position and the flexible differ in its extended position as shown in FIG. 2, the fluorescent tubes 8,9 are activated and light from the tubes will be diffused to provide uniform background radiation. However, in contrast to the previous example, the operator is then able to activate the motor 10 causing the cables 13 to unwind from the pulleys 12. The light diffuser 5 is drawn around the roller 7 due to the action of the torsion spring causing the diffuser 5 to be withdrawn into the retracted position thus allowing the transparency to be reviewed under non diffuse illumination.

The operator is then able to turn off the illumination and activate the scanning system as described with respect to the previous example. However, in this case it is essential that the flexible diffuser 5 has been previously retracted.

We claim:

1. Image viewing apparatus comprising a transparent platen on which an image to be scanned can be positioned; a scanning system support movable alongside said platen; a light source for illuminating said platen from the same side as said scanning system support; a flexible light diffuser which can be moved between a first position in which it is located between said light source and said platen whereby light from said light source is diffused across said platen, and a second position in which said light diffuser is positioned so as not to impede a scanning system on said support from scanning an image on the platen; and a roller about which said light diffuser is wound in its second position.

2. Apparatus according to claim 1, wherein said light diffuser comprises a sheet.

3. Apparatus according to claim 2, wherein said light diffuser is made of polyester.

4. Apparatus according to claim 1, further comprising actuating means for moving said light diffuser between said first and second positions.

5. Apparatus according to claim 1, wherein said light diffuser is coupled to said scanning system support.

6. Apparatus according to claim 1, wherein said light diffuser is biased towards said second position.

7. Apparatus according to claim 1, wherein more than one light source is provided.

8. Apparatus according to claim 1, wherein said light source comprises a fluorescent tube.

9. An image scanning device comprising image viewing apparatus comprising a transparent platen on which an image to be scanned can be positioned; a scanning system support movable alongside said platen; a light source for illuminating said platen from the same side as said scanning system support; an image scanning system mounted on said support; a flexible light diffuser which can be moved between a first position in which it is located between said light source and said platen whereby light from said light source is diffused across said platen, and a second position in which said light diffuser is positioned so as not to impede said scanning system on said support from scanning an image on the platen; and a roller about which said light diffuser is wound in its second position.

10. Apparatus according to claim 9, wherein said light diffuser comprises a sheet.

11. Apparatus according to claim 10, wherein said light diffuser is made of polyester.

12. Apparatus according to claim 9, further comprising actuating means for moving said light diffuser between said first and second positions.

13. Apparatus according to claim 9, wherein said light diffuser is coupled to said scanning system support.

14. Apparatus according to claim 9, wherein said light diffuser is biased towards said second position.

15. Apparatus according to claim 9, wherein more than one light source is provided.

16. Apparatus according to claim 9, wherein said light source comprises a fluorescent tube.

* * * * *